US009069135B2

(12) United States Patent
Xiong et al.

(10) Patent No.: US 9,069,135 B2
(45) Date of Patent: Jun. 30, 2015

(54) OPTICAL DEPOLARIZER

(71) Applicant: JDS Uniphase Corporation, Milpitas, CA (US)

(72) Inventors: Wei Xiong, Nanshan District Shenzhen (CN); Maxim Bolshtyansky, East Windsor, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 282 days.

(21) Appl. No.: 13/848,654

(22) Filed: Mar. 21, 2013

(65) Prior Publication Data

US 2013/0250416 A1     Sep. 26, 2013

Related U.S. Application Data

(60) Provisional application No. 61/613,871, filed on Mar. 21, 2012.

(51) Int. Cl.
*G02B 5/30* (2006.01)
*G02B 27/28* (2006.01)
*G02B 6/27* (2006.01)

(52) U.S. Cl.
CPC .............. *G02B 5/30* (2013.01); *G02B 27/286* (2013.01); *G02B 6/272* (2013.01); *G02B 6/2746* (2013.01); *G02B 6/2773* (2013.01); *G02B 6/2786* (2013.01)

(58) Field of Classification Search
CPC ........ G02B 5/30; G02B 27/286; G02B 6/272; G02B 6/2746; G02B 6/2773; G02B 6/2786
USPC ............. 359/489.02, 489.05, 489.16–489.18, 359/494.01; 385/31; 372/108, 109
See application file for complete search history.

(56) References Cited

U.S. PATENT DOCUMENTS

| | | | |
|---|---|---|---|
| 4,915,503 A * | 4/1990 | Pavlath | 356/460 |
| 5,689,367 A * | 11/1997 | Pan et al. | 359/489.09 |
| 5,692,082 A | 11/1997 | Fukushima | 385/88 |
| 6,498,869 B1 * | 12/2002 | Yao | 385/11 |
| 6,522,796 B1 | 2/2003 | Ziari et al. | 385/11 |
| 6,574,015 B1 | 6/2003 | Tselikov et al. | 398/36 |
| 6,611,369 B2 | 8/2003 | Matsushita et al. | 359/334 |
| 6,831,778 B2 | 12/2004 | Yang et al. | 359/341.3 |
| 6,870,973 B2 | 3/2005 | Fidric et al. | 385/11 |
| 6,977,769 B2 | 12/2005 | Matsushita et al. | 359/334 |
| 6,987,896 B1 | 1/2006 | Li et al. | 385/11 |
| 7,002,733 B2 | 2/2006 | Dagenais et al. | 359/337 |
| 7,072,369 B2 | 7/2006 | Matsushita et al. | 372/29.02 |
| 7,085,441 B1 | 8/2006 | Kozlov | 385/11 |
| 2002/0141698 A1 | 10/2002 | Matsushita et al. | 385/31 |
| 2004/0184148 A1 | 9/2004 | Chang et al. | 359/484.03 |
| 2005/0094919 A1 | 5/2005 | Li et al. | 385/11 |
| 2009/0225420 A1 | 9/2009 | Yao et al. | 359/485.06 |

* cited by examiner

*Primary Examiner* — Frank Font
(74) *Attorney, Agent, or Firm* — JDS Uniphase Corporation

(57) ABSTRACT

A polarized light beam having a coherence length L can be depolarized by splitting the beam into orthogonally polarized sub-beams and delaying one of the sub-beams relative to the other by a length larger than L. This spatial delay is created by splitting the beam in a walk-off crystal and disposing in the optical path of one of the sub-beams a slab of an optically dense material, while allowing the other sub-beam to propagate outside and near the slab. The sub-beams remain parallel to each other, allowing another walk-off crystal to be used to recombine the sub-beams. A dual-core fiber ferrule and a microlens array can be used to combine fiber-coupled output beams of two laser diodes in a single compact walk-off crystal.

20 Claims, 7 Drawing Sheets

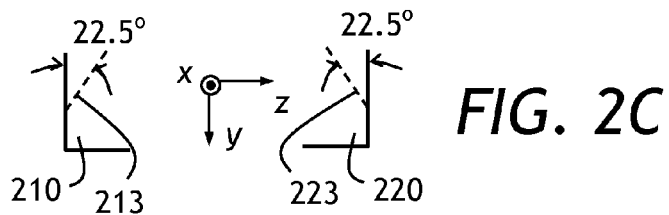
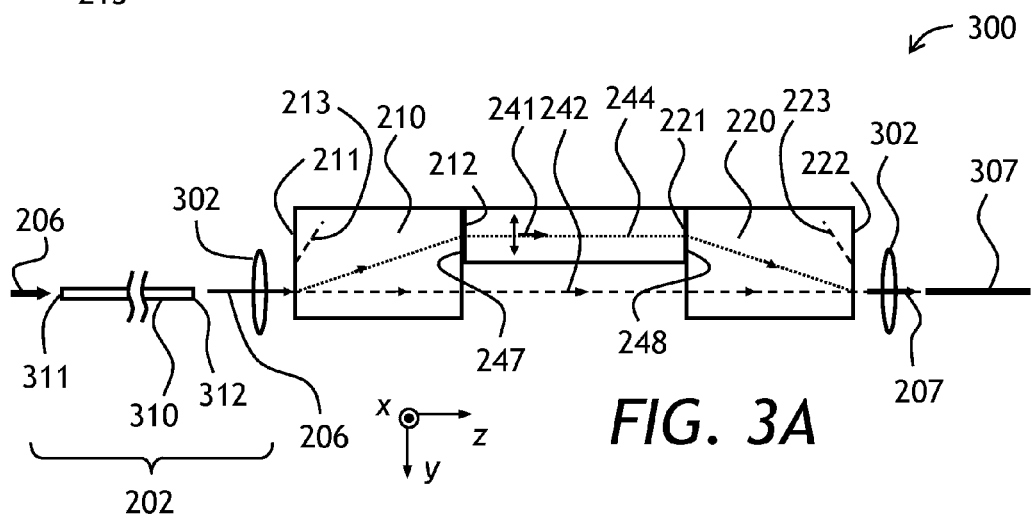
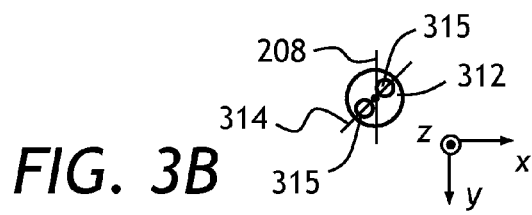
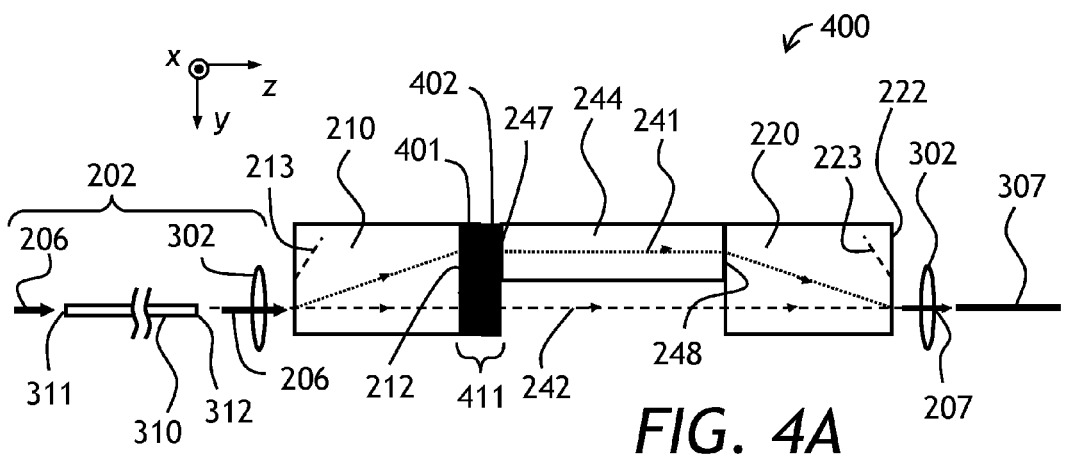

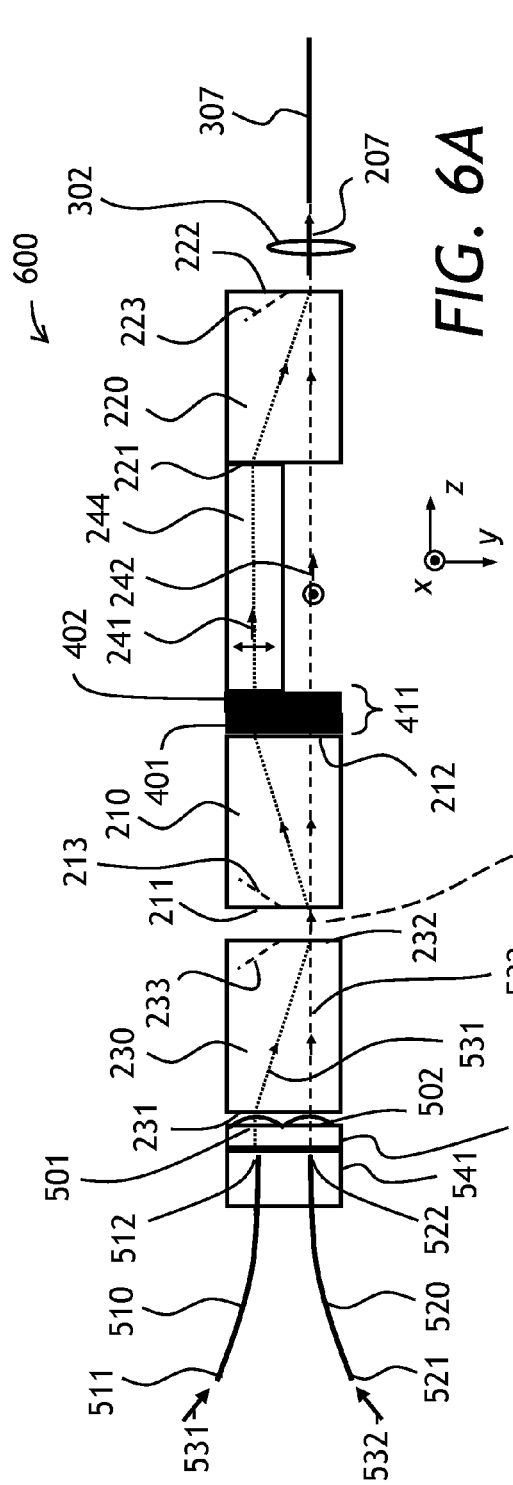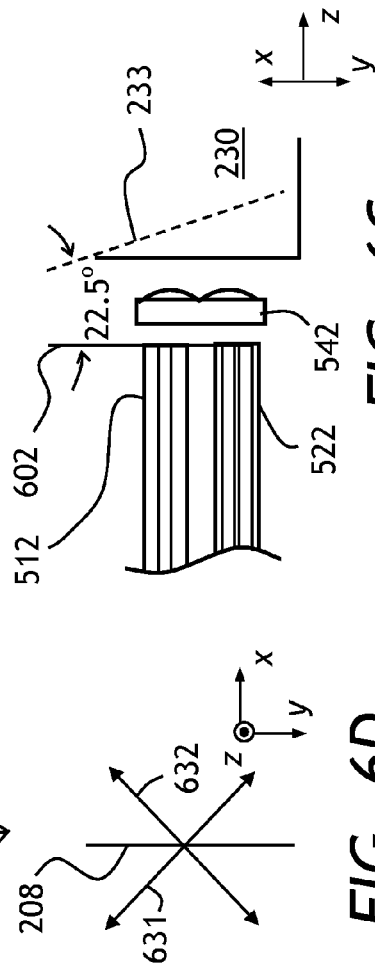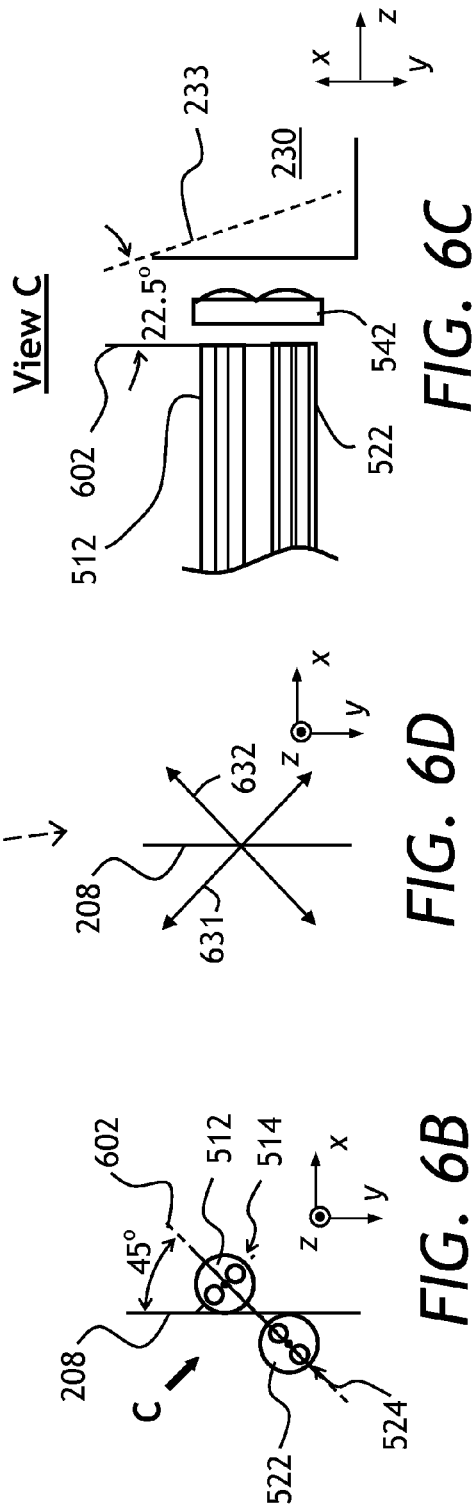

OPTICAL DEPOLARIZER

CROSS-REFERENCE TO RELATED APPLICATIONS

The present invention claims priority from U.S. patent application Ser. No. 61/613,871 filed Mar. 21, 2012, which is incorporated herein by reference.

TECHNICAL FIELD

The present invention relates to optical components and modules, and in particular to optical components and modules for depolarizing light.

BACKGROUND OF THE INVENTION

Most laser light sources emit polarized light during operation. While a polarized state of light can be advantageously used in some applications, in other applications it is detrimental. For example, for Raman amplification of an optical signal in a non-polarization maintaining optical fiber of a fiberoptic communication link, a depolarized Raman pump light source is needed. This is because a Raman amplification process is sensitive to mutual polarizations of the signal and the pump, which tend to be randomly fluctuating in non-polarization maintaining fibers.

A common approach to depolarizing a polarized light beam having a coherence length L is to split the beam into two orthogonally polarized sub-beams, delay one of the sub-beams by a length larger than L relative to the other sub-beam, and recombine the sub-beams into an output optical beam. This causes the correlation of phase between the sub-beams to be lost, which effectively scrambles the output polarization. A polarization beam combiner is sometimes used in combination with the depolarizer, to combine and depolarize optical beams of two laser diodes at the same time. Using two laser diodes instead of one allows one to increase the output power of the depolarized optical beam, and to improve reliability via redundancy.

Referring to FIGS. 1A and 1B, a prior-art depolarized laser light source 100 includes first and second laser diodes 71 and 72 coupled via polarization-maintaining optical fibers 73 and 74 to input ports 81 and 82, respectively, of a polarization beam combiner 8. A birefringent crystal 10 is coupled to an exit port 83 of the polarization beam combiner 8. In operation, lightwaves from each of the laser diodes 71 and 72 impinge onto the birefringent crystal 10, as shown in FIG. 1B. The crystal principal axis of the birefringent crystal 10 is disposed at 45 degrees with respect to the polarization directions of the combined lightwaves. Each of the combined lightwaves is split within the birefringent crystal 10 into two waves having orthogonal linear polarizations, one of which is delayed by a length L with respect to the other. When the delay L is larger than each coherence length of the lightwaves generated by the laser diodes 71 and 72, the combined lightwaves in an output fiber 75 are depolarized. The light source 100 has been disclosed by Matsushita et al. in US Patent Application Publication 2002/0141698.

One drawback of the light source 100 of Matsushita is that it usually requires a very long birefringent crystal 10. By way of example, a Raman pump laser diode manufactured by JDS Uniphase Corporation of Milpitas, Calif., USA, has a coherence length of 60 mm. When using YVO$_4$ crystal 10 having $\Delta n = n_e - n_o \approx 0.2$, one would require the YVO$_4$ crystal 10 to be at least 60 mm/0.2=300 mm long to depolarize the light emitted by this Raman pump diode. Such a long crystal is impractical to grow.

Ziari et al. in U.S. Pat. No. 6,522,796 disclose a light source similar to the light source 100 shown in FIG. 1. The Ziari device uses a polarization beamsplitter cube in place of the polarization beam combiner 8, and a length of polarization-maintaining (PM) optical fiber in place of the birefringent crystal 10. A polarization maintaining fiber is also used by Fukushima in U.S. Pat. No. 5,692,082 to depolarize laser diode light. The length of the PM fiber must be large enough, so that the optical path difference (OPD) between the orthogonal polarization modes in the PM fiber is greater than the coherence length of the light source. By way of example, for the above mentioned Raman pump laser diode, a required length of a typical PM fiber with the birefringence $\Delta n = n_e - n_o \approx 3.7 \times 10^{-4}$ should be at least 60 mm/3.7×10$^{-4}$=160 m. A 160 m long PM fiber is lossy, expensive, and bulky.

Fidric et al. in U.S. Pat. No. 6,870,973 disclose a method allowing one to reduce the required length of the PM fiber. In a depolarized light source of Fidric et al., polarizations of multiple longitudinal modes of a Raman pump laser diode are overlapped, by converting half of the longitudinal modes to an orthogonal polarization state. As a result, a significantly shorter PM fiber length is required. The coherence length of this laser is only 9 mm, thus requiring only 24 m of PM fiber, or only 44 mm long YVO$_4$ crystals. However, these length values are still too long for constructing a compact and inexpensive depolarized light source.

Another approach, taken by Yao et al. in US Patent Application Publication 2009/0225420, is to create the required optical path difference in a bulk-optic delay line or in a Michelson interferometer based on a polarization beamsplitter cube. The beams of orthogonal polarizations propagate along different directions in different optical paths, and one of the beams is delayed with respect to the other in a dedicated delay line. Optical path differences of tens of millimeters can easily be created in a bulk-optic delay line. Detrimentally, Michelson interferometers require complex optomechanical packaging to ensure stable operation.

Tselikov et al. in U.S. Pat. No. 6,574,015 disclose a depolarizer based on a pair of polarization beam splitters and a fiberoptic delay line. One of the two orthogonally polarized sub-beams propagates in free space, and the other is coupled to a length of optical fiber. However, a fiberoptic delay line can create an unwanted temperature dependent variation of optical loss in one of the two optical paths for polarized sub-beams.

Most of the above described depolarizers and beam combiners use optical polarizing beamsplitter cubes. In a polarizing beamsplitter cube, the orthogonally polarized incoming and/or outgoing optical beams are disposed at 90 degrees to each other. Since the inputs and outputs of the beam combiners and depolarizers are usually coupled to an optical fiber, the overall size of the device is increased due to a requirement to route all optical fibers on one end of the package, while observing a minimum bending radius of an optical fiber.

Walk-off crystals can be used for combining or splitting orthogonally polarized beams. For example, Ziari et al. in U.S. Pat. No. 6,522,796 disclose, as an alternative, a polarization beam combiner having parallel input optical fibers coupled to a walk-off crystal through a couple of adjacently disposed lenses, thus not requiring the optical fibers to be bent within the package. This polarization beam combiner must use a walk-off crystal of sufficient length to create enough lateral displacement to accommodate two adjacent collimating lenses for coupling light into parallel fibers. For example, ~20 m YVO$_4$ crystal would be required to combine two orthogonal polarized beams spaced 2.0 mm apart. It is desirable to further reduce size of a polarization beam combiner.

Therefore, the prior art is lacking a compact, stable, reliable, and inexpensive depolarizer, especially a polarization beam combining depolarizer.

SUMMARY OF THE INVENTION

A polarized light beam having a coherence length L can be depolarized by splitting the beam into orthogonally polarized sub-beams and delaying one of the sub-beams relative to the other by a length larger than L. According to the invention, this spatial delay can be created by splitting the beam in a walk-off crystal and disposing in the optical path of one of the sub-beams a slab of an optically dense material, such as glass or silicon, for example, while allowing the other sub-beam to propagate in air or inert gas near the slab. In this way, quite large optical path differences can be created in a very compact package, especially if a high-index slab material, such as silicon, is used. The sub-beams remain parallel to each other, allowing another walk-off crystal, preferably identical to the first one, to be used to recombine the sub-beams. Since the optical path difference can be generated mostly in the slab, the birefringent walk-off crystals can be made small. In accordance with another aspect of the invention, a dual-core fiber ferrule and a microlens array is used to combine fiber-coupled output beams of two laser diodes in a single compact walk-off crystal, resulting in a very compact polarization beam combining depolarizer.

In accordance with the invention, there is provided an optical depolarizer comprising an in-coupling polarizer for defining a linear polarization of an input optical beam at 45 degrees with respect to a first axis, and a first walk-off crystal having first and second opposed ends. The first end of the first walk-off crystal is coupled to the in-coupling polarizer. The first walk-off crystal is sized and oriented to split the input optical beam launched at its first end into first and second parallel laterally offset sub-beams exiting from its second end. The first and second sub-beams at the second end are linearly polarized parallel and perpendicular, respectively, to the first axis.

A slab of a transparent solid material, having a refractive index and a length between its first and second opposed ends, is coupled at its first end to the second end of the first walk-off crystal, and disposed in an optical path of the first sub-beam and not in an optical path of the second sub-beam. The slab length multiplied by the slab refractive index is at least 1 mm. A second walk-off crystal having first and second opposed ends is coupled at its first end to the slab's second end and sized and oriented to recombine the first and second sub-beams at the second end of the second walk-off crystal into an output optical beam.

In operation, the input optical beam is launched into the in-coupling polarizer. The first walk-off crystal splits the input optical beam into the first and second sub-beams. The first sub-beam propagates in the slab from its first to its second end, and the second sub-beam propagates proximate the slab in air, neutral gas, or vacuum, whereby the depolarizing optical path difference is generated. The second walk-off crystal combines the sub-beams into a single depolarized output beam.

The in-coupling polarizer can include a collimator lens and a polarization maintaining optical fiber having a first end for inputting the input optical beam, and a second end coupled to the first end of the walk-off crystal through the collimator lens. A stress direction at the second end of the polarization maintaining fiber is at 45 degrees with respect to the first axis, thereby defining the linear polarization of the input optical beam at 45 degrees with respect to the first axis.

In one embodiment, the depolarizer can operate with not one but two laser diodes. In this beam-combining depolarizer, the in-coupling polarizer can include a third walk-off crystal having opposed first and second ends; first and second adjacently disposed collimator microlenses; and first and second polarization maintaining fibers each having a first end for inputting first and second input optical beams, respectively, and a second end coupled to the first end of the third walk-off crystal through the first and second collimator microlenses, respectively. A stress direction at the second ends of the first and second polarization maintaining fiber is preferably oriented at +45 degrees and −45 degrees, respectively, with respect to the first axis. The second end of the third walk-off crystal is coupled to the first end of the first walk-off crystal. The third walk-off crystal is preferably oriented to define the linear polarization of the first and second input optical beams at +45 degrees and −45 degrees with respect to the first axis, and is sized to combine the first and second optical beams at the first end of the first walk-off crystal.

The above disclosed depolarizers can also include a Faraday element-waveplate isolator stack for suppression of reverse-propagating light.

In accordance with another aspect of the invention, there is further provided a laser source including an above described depolarizer coupled to a laser diode. The coherence length of the laser beam is smaller than the slab length multiplied by the slab refractive index, whereby the output optical beam is substantially depolarized.

In accordance with another aspect of the invention, there is further provided a laser source including an above described beam-combining depolarizer coupled to a pair of laser diodes emitting first and second optical beams having first and second coherence lengths, respectively. The first and second coherence lengths are smaller than the slab length multiplied by the slab refractive index, whereby the output optical beam is substantially depolarized.

In accordance with another aspect of the invention, there is further provided a method for depolarizing a linearly polarized optical beam, the method comprising:

(a) providing an optical depolarizer described above;

(b) coupling a first input optical beam having a first coherence length to the first end of the first walk-off crystal, wherein the first input optical beam is linearly polarized at 45 degrees with respect to the first axis, and wherein the slab length multiplied by the slab refractive index is selected to be larger than the first coherence length;

(c) allowing the first input optical beam to propagate through the first walk-off crystal and split into first and second parallel laterally offset sub-beams at the second end of the first walk-off crystal, wherein the first and second sub-beams at the second end of the first walk-off crystal are linearly polarized parallel and perpendicular, respectively, to the first axis;

(d) allowing the first sub-beam to propagate in the slab from the first to the second end thereof, and the second sub-beam to propagate proximate the slab in the air or the neutral gas; and (e) allowing the first and second sub-beams to propagate through the second walk-off crystal to recombine at the second end of the second walk-off crystal into the output optical beam.

BRIEF DESCRIPTION OF THE DRAWINGS

Exemplary embodiments will now be described in conjunction with the drawings, in which:

FIG. 2C is a schematic view of orientation of birefringent axes of walk-off crystals of the depolarizer of FIG. 2A;

FIG. 3A is a side view of an embodiment of the depolarizer of FIG. 2A, wherein the in-coupling polarizer includes a PM fiber;

FIG. 3B is a frontal view of the PM fiber of FIG. 3A;

FIG. 4A is a side view of an embodiment of the depolarizer of FIG. 3A including an isolating stack, showing light propagating in a forward direction;

FIG. 6A is a schematic view of a beam combining isolating depolarizer of the invention, wherein the in-coupling polarizer includes a walk-off crystal, and the isolating depolarizer is similar to that of FIGS. 4A and 4B;

FIG. 6B is a frontal view of PM fibers of the beam combining isolating depolarizer of FIG. 6A;

FIG. 6C is a side view taken along the direction of view C denoted in FIG. 6B, wherein the side view of FIG. 6C shows the birefringent axis orientation of a walk-off crystal of the in-coupling polarizer of the beam combining isolating depolarizer of FIG. 6A;

FIG. 6D is a polarization diagram showing relative polarizations of incoming optical beams in the beam combining isolating depolarizer of FIG. 6A;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
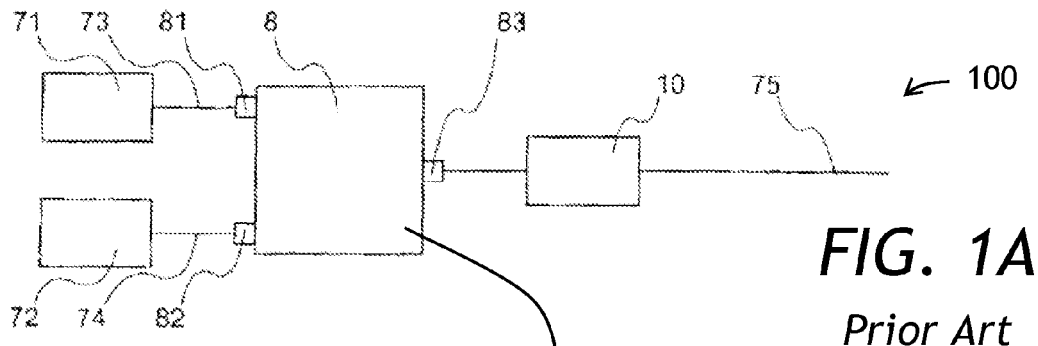
FIG. 1A is a block diagram of a prior-art depolarized light source.
Figure 1B:
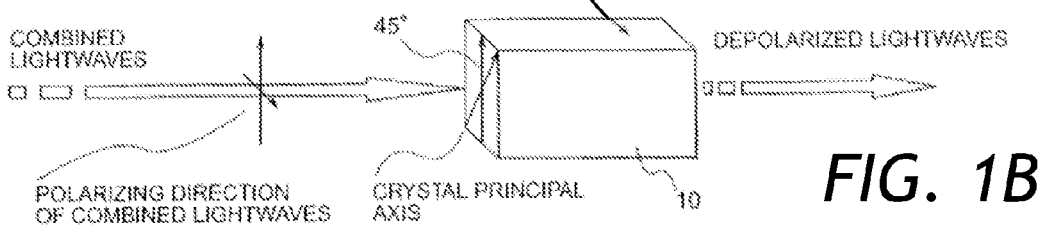
FIG. 1B is a three-dimensional view of a birefringent crystal used to depolarize light in the depolarized light source of FIG. 1A.
Figure 2A:
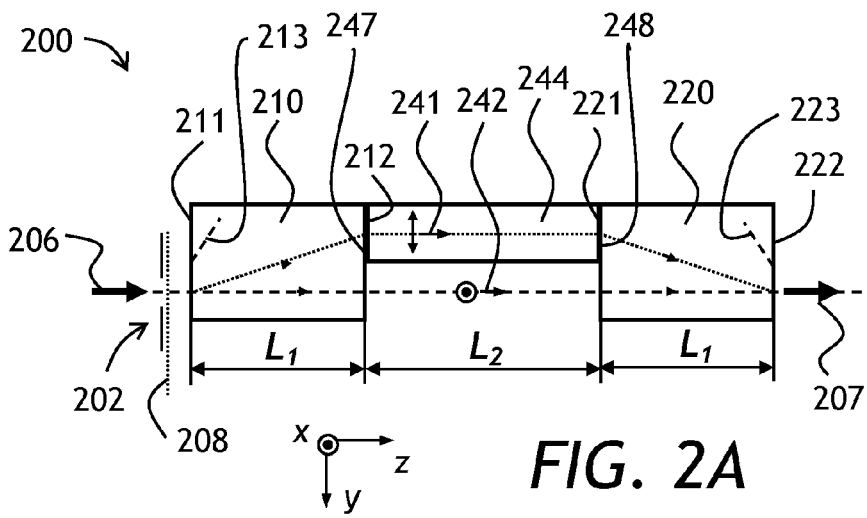
FIG. 2A is a side view of a depolarizer of the invention.
Figure 2B:
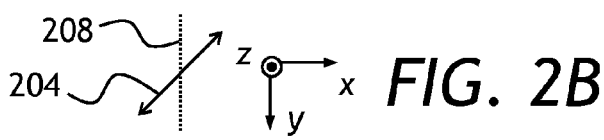
FIG. 2B is a schematic view of an input polarization defined by an in-coupling polarizer of the depolarizer of FIG. 2A.

Referring to FIGS. 2A to 2C, an optical depolarizer 200 includes an in-coupling polarizer 202 for defining a linear polarization 204 of an input optical beam 206 at 45 degrees with respect to a first axis 208. A first walk-off crystal 210 has first 211 and second 212 opposed ends. The first end 211 of the first walk-off crystal 210 is coupled to the in-coupling polarizer 202. The first walk-off crystal 210 is sized and oriented to split the input optical beam 206 launched at its first end 211 into first 241 and second 242 parallel laterally offset sub-beams exiting from its second end 212. The first and second sub-beams 241 and 242 at the second end 212 are linearly polarized parallel and perpendicular, respectively, to the first axis 208.

A slab 244 of a transparent solid material has a refractive index n. The slab 244 has a length $L_2$ between its first 247 and second 248 opposed ends. The slab length $L_2$ multiplied by the slab refractive index n is at least 1 mm, more preferably at least 3 mm, and most preferably 5 mm to 10 mm. The slab 244 is coupled at its first end 247 to the second end 212 of the first walk-off crystal 210 and disposed in an optical path of the first sub-beam 241 and not in an optical path of the second sub-beam 242. When the input optical beam 206 is launched into the in-coupling polarizer 202, the first sub-beam 241 propagates in the slab 244 from its first end to its second end, and the second sub-beam 242 propagates proximate the slab 244 in air, neutral gas, vacuum, or another medium having a refractive index close to 1, for example between 1 and 1.1.

A second walk-off crystal 220 has first 221 and second 222 opposed ends. The second walk-off crystal 220 is coupled at its first end 221 to the second end 248 of the slab 244, and sized and oriented to recombine the first 241 and second 242 sub-beams at the second end 222 of the second walk-off crystal 220 into an output optical beam 207.

In FIG. 2A, the input 206 and output 307 optical beams, and the sub-beams 241 and 242 are shown as propagating along the Z axis. In FIG. 2B, the first axis 208 is parallel to the Y axis. In FIGS. 2A and 2C, optical axes 213 and 223 of the first and second walk-off crystals 210 and 220, respectively, are disposed in the YZ plane. The first and second walk-off crystals 210 and 220 can be made of $YVO_4$ or another suitable birefringent material, such as rutile or calcite, for example. For $YVO_4$ crystals 210 and 220, the optical axes 213 and 223 makes an angle of 22.5 degrees with respect to the Y axis. When both the first 210 and the second 220 walk-off crystals are made of a same material, their lengths $L_1$ are equal to each other, because the walk-off created by the first walk-off crystal 210 needs to be exactly compensated by the second walk-off crystal 220. Various walk-off crystals 210 and 220, sized and shaped for creating lateral displacement along the Y-axis between the polarized sub-beams 241 and 242, can be used. Various permutations of crystal orientations can also be used to achieve the same purpose of splitting and subsequent recombining the polarized sub-beams 241 and 242. It is well known to the skilled person how to select axis orientation and the length of birefringent crystals to create a pre-defined amount of lateral displacement. The first walk-off crystal 210, the slab 244, and the second walk-off crystal 220 can be placed into mechanical holders ensuring their mutual disposition and orientation, or simply epoxied to each other into a single solid stack.

A magnitude of the lateral displacement should be made sufficient for the polarized sub-beams 241 and 242 to be separated enough to propagate substantially without a clipping loss within and outside of the slab 244, respectively, as shown in FIG. 2A. By way of a non-limiting example, 20 mm long $YVO_4$ crystals 210 and 220 can be used, giving a displacement along the Y axis of approximately 2 mm.

Advantageously, the depolarizer 200 of FIG. 2 can be made very compact. By way of a non-limiting example, to generate an optical path difference of 9 mm, a 15 mm long slab of glass having the refractive index of 1.6 can be used. Thus, the total length of the depolarizer 200 becomes 20 mm ($L_1$)+15 mm ($L_2$)+20 mm ($L_2$)=55 mm. This length can be further reduced if a crystalline silicon is used in place of glass. The refractive index of silicon at a typical Raman wavelength of 1.48 um is very high, approx. 3.5. Only $L_2=3.6$ mm of silicon slab length will be required. To avoid disturbing the polarization state of the first sub-beam 241, the crystal axis of the crystalline silicon should be preferably directed along the direction of propagation, that is, Z axis.

Referring now to FIGS. 3A and 3B with further reference to FIGS. 2A and 2B, an optical depolarizer 300 is an embodiment of the optical depolarizer 200 of FIG. 2A. The optical depolarizer 300 of FIG. 3A includes a variant of the incoupling polarizer 202, including a collimator lens 302 and a PM optical fiber 310 having a first end 311 for inputting the input optical beam 206 and a second end 312 coupled to the first end 211 of the first walk-off crystal 210 through the collimator lens 302.

Referring specifically to FIG. 3B, a stress direction 314 at the second end 312 of the PM fiber 310 is at 45 degrees with respect to the first axis 208, thereby defining the linear polarization of the input optical beam 206 at 45 degrees with respect to the first axis 208. The stress direction 314 is defined by a line passing through centers of stress rods 315. It is to be noted, however, that the input optical beam 206 can be launched into the first end 311 of the PM fiber 310 with polarization either parallel to the local stress direction at the first end 311, not shown, or perpendicular to the local stress direction at the first end 311. In both cases, the launched polarization will be maintained in the PM fiber 310, so that the input optical beam 206 at the first end 211 of the first walk-off optical crystal 210 will be polarized at 45 degrees away from the first axis 208. Thus, 45 degrees with respect to the first axis 208 can include both directions, +45 degrees and −45 degrees, so that both launch conditions, along the "o-axis" and along the "e-axis" of the PM fiber 310 as they are sometimes called, are equally possible.

In operation, the input optical beam 206 is coupled into the first end 311 of the PM fiber 310, exits the second end 312, gets collimated by the lens 302; and splits into the first 241 and second 242 sub-beams in the first walk-off crystal 210. The first sub-beam 241 propagates through the slab 244, and the second sub-beam 242 propagates in free space, e.g. air or inert gas, outside and near the slab 244. Thus, an optical path difference is created between the first 241 and second 242 sub-beams. The sub-beams 241 and 242 are re-combined by the second walk-off crystal 220 to form the output optical beam 207. If output fiber coupling of the output optical beam 207 is required, another, focusing lens 302 can be used to focus the output optical beam 207 into an output fiber 307.

Turning to FIG. 4A with further reference to FIG. 3A, an isolating depolarizer 400 of FIG. 4A is a variant of the depolarizer 300 of FIG. 3A. To attain the isolating property, the isolating depolarizer 400 of FIG. 4A includes a stack 411 of a Faraday element 401 and a half-wave waveplate 402. The stack 411 is coupled between the second end 212 of the first walk-off crystal 210 and the first end 247 of the slab 244. In operation, the Faraday element 401 rotates the polarization of the sub-beams 241 and 242 by 45 degrees, and the waveplate 402 rotates the polarization back by 45 degrees. As a result, the polarization of light propagating from the first walk-off crystal 410 to the second walk-off crystal 420 is substantially unaffected, so that the second walk-off crystal 420 can recombine the sub-beams 241 and 242 into the output optical beam 207, which is then focused by the lens 302 into the output optical fiber 307. Therefore, the performance of the isolating depolarizer 400 is substantially unaffected in the forward direction, except perhaps for a slight increase of insertion loss due to propagation of the sub-beams 411 and 412 through the Faraday element 401 of the stack 411.

Figure 4B:
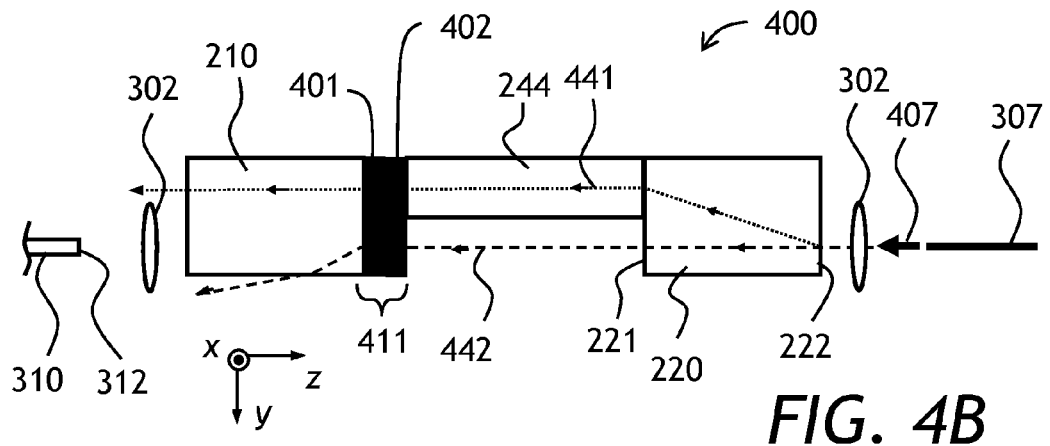
FIG. 4B is a side view of the depolarizer of FIG. 4A, showing light propagating in a backward direction.

Referring now to FIG. 4B, the isolating property of the depolarizer 400 will be explained. Any residual light 407 emitted from the output optical fiber 307 will be collimated by the focusing right-side lens 302 and coupled to the second end 222 of the second walk-off crystal 220. The second walk-off crystal 220 splits the residual light 407 into orthogonally polarized reverse sub-beams 441 and 442, which then propagate within and outside, respectively, of the slab 244. The waveplate 402 rotates the polarization of the reverse sub-beams 441 and 442 by 45 degrees, and the Faraday element 401 rotates the polarization by extra 45 degrees. As a result, the polarization of light propagating from the first walk-off crystal 410 to the second walk-off crystal 420 is rotated by 90 degrees. When the reverse sub-beams 441 and 442 enter the first walk-off crystal 410, the first reverse sub-beam 441 will not be displaced, but the second reverse sub-beam 442 will be displaced downwards as shown in FIG. 4B. This happens because the reverse sub-beams 441 and 442 had had their polarization rotated by the stack 411 by 90 degrees. As a result, the reverse sub-beams 441 and 442 will not be coupled into the second end 312 of the input optical fiber 310, thereby achieving the isolating function.

The Faraday element 401 and the half-wave waveplate 402 are mechanically coupled to each other to form the stack 411, and oriented for rotating by 90 degrees polarization of light propagating from the second walk-off crystal 220 to the first 210, while substantially not rotating the polarization of light propagating from the first walk-off crystal 210 to the second 220, as explained above. Of course, the stack 411 can also be disposed proximate the second walk-off crystal 220, or anywhere in the optical path of both reverse sub-beams 441 and 442 between the second end 212 of the first walk-off crystal 210 and the first end 421 of the second walk-off crystal 220. If desired, the Faraday element 401 and the half-wave waveplate 402 can even be disposed separately from each other on opposite sides of the slab 244. Furthermore, embodiments are possible where the forward propagating light has its polarization rotated by 90 degrees, and backward propagating light has its polarization not rotated. In the latter case, the second walk-off crystal 220 will have to be rotated about the Z axis by 180 degrees.

Figure 5A:
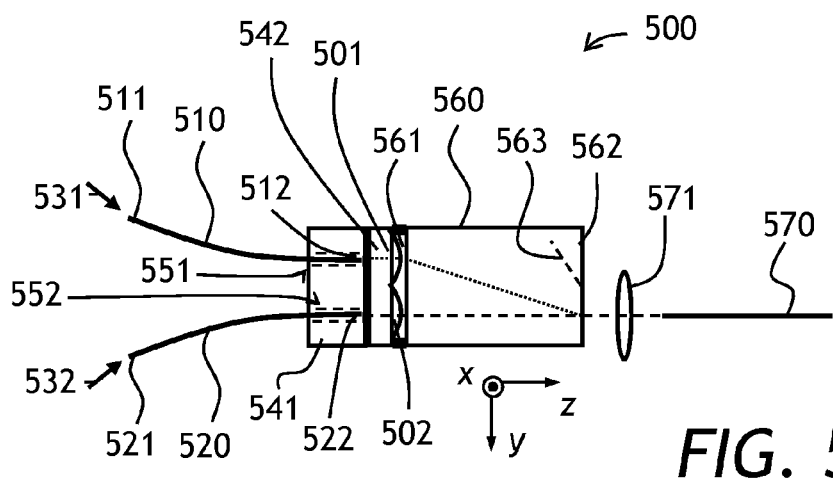
FIG. 5A is a side view of a polarization beam combiner according to the invention.

According to one aspect of the invention, the overall size of any polarization beam combining depolarizer can be further reduced by using a compact polarization beam combiner based on a walk-off crystal. Turning now to FIG. 5A, a polarization beam combiner 500 of the invention is shown. The polarization beam combiner 500 includes a walk-off crystal 560 having opposed first 561 and second 562 ends, first 501 and second 502 adjacently disposed collimator microlenses, and first 510 and second 520 PM fibers. A first input optical beam 531 is input into a first end 511 of the first PM fiber 510, and a second input optical beam 532 is input into a first end 521 of the second PM fiber 520. Second ends 512 and 522 of the first 510 and second 520 PM fibers, respectively, are coupled to the first end 561 of the walk-off crystal 560 through the first 501 and second 502 collimator microlenses, respectively. The walk-off crystal 560 is oriented and sized to combine the first 531 and second 532 input optical beams at its second end 562, for coupling into an optional output optical fiber 570 through an optional focusing lens 571.

The polarization beam combiner 500 includes a first substrate 541 having a pair of parallel through openings 551, 552 for supporting therein the second ends 512, 522 of the first and second PM fibers 510 and 520, respectively. The first 501 and second 502 collimator microlenses are disposed on a common second substrate 542. The first 541 and second 542 substrates are mechanically affixed, for example epoxied or glass-soldered, to each other. Various types of microlenses 501 and 502 can be used, including, for example, gradient-index microlenses formed within the second substrate 542.

Figure 5B:
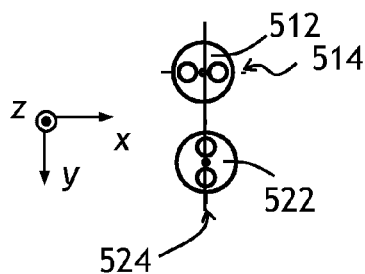
FIG. 5B is a front view of PM fibers of the polarization beam combiner of FIG. 5A.

Turning to FIG. 5B with further reference to FIG. 5A, stress directions 514 and 524 at the second ends 512, 522 of the first 510 and second 520 PM fibers, respectively, are oriented perpendicular to each other. The stress directions 514 and 524 can also be parallel to each other. What is important is to couple the input optical beams 531 and 532 into the PM fibers 510 and 520 such that their polarizations are perpendicular to each other at the first end 561 of the walk-off crystal 560, to enable the walk-off crystal 560 to combine the input optical beams 531 and 532 at the second end 562 of the walk-off crystal 560.

Figure 5C:
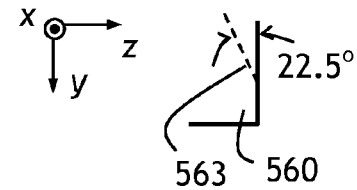
FIG. 5C is a schematic view of orientation of a birefringent axis of walk-off crystals of the polarization beam combiner of FIG. 5A.

Referring to FIG. 5C with further reference to FIG. 5A, the orientation of a crystal axis 563 of the walk-off crystal 560 is shown. The crystal axis 563 is disposed in YZ plane. For $YVO_4$ crystal 560, the crystal axis 563 makes an angle of 22.5 degrees with respect to the Y axis, as shown.

Referring now to FIG. 6A with further reference to FIGS. 4A, 4B, and 5A, an isolating, beam-combining depolarizer 600 of FIG. 6A is similar to the isolating beam-combining depolarizer 400 of FIGS. 4A and 4B. In the isolating beam-combining depolarizer 600 of FIG. 6A, the in-coupling polarizer 202 includes a third walk-off crystal 230 having opposed first 231 and second 232 ends; the first 510 and second 520 PM fibers for inputting the first 531 and second 532 input optical beams, respectively; and the first 501 and second 502 adjacently disposed collimator microlenses. The second ends 512 and 522 of the first 510 and second 520 PM fibers, respectively, are coupled to the first end 231 of the third walk-off crystal 230 through the first 501 and second 502 collimator microlenses, respectively. The second end 232 of the third walk-off crystal 230 is coupled to the first end 211 of the first walk-off crystal 210. The in-coupling polarizer 202 of the isolating beam-combining depolarizer 600 is similar to the polarization beam combiner 500 of FIG. 5A. One difference is that the orientation of a crystal axis 233 of the third birefringent crystal 230, and the orientation of the second ends 512 and 522 of the first and second PM fibers 510 and 520, respectively, are different.

Referring to FIGS. 6B and 6C with further reference to FIGS. 6A and 5B, stress directions 514 and 524 at the second ends 512 and 522 of the first and second PM fibers 510 and 520, respectively, are oriented at +45 degrees and −45 degrees, respectively, with respect to the first axis 208. The second ends 512 and 522 of the first 510 and second 520 PM fibers, respectively, are disposed on a line 602 at 45 degrees with respect to the first axis 208. In comparison with FIG. 5B, the second fiber ends 512 and 522 of FIG. 6B are rotated about Z axis by 45 degrees.

Referring now to FIGS. 6C and 6D with further reference to FIG. 5C, the crystal axis 233 of the third walk-off crystal 230 is disposed in a plane including the second fiber ends 512 and 522, which is the plane of FIG. 6C. For $YVO_4$ crystal 230, the crystal axis 233 makes an angle of 22.5 degrees with respect to the line 602, as shown. This orientation of the crystal axis 233 allows one to define linear polarizations 631 and 632 of the first 531 and second 532 input optical beams at +45 degrees and −45 degrees with respect to the first axis 208. The orientations of the linear polarizations of the first 531 and second 532 input optical beams are shown in FIG. 6D.

Referring back to FIG. 6A, the third walk-off crystal 530 is sized to combine the first 531 and second 532 optical beams at the first end 211 of the first walk-off crystal 210. In comparison with FIG. 5C, the crystal axis 233 of the third walk-off crystal 230 in FIG. 6C is rotated by 45 degrees about the Z axis. Referring specifically to FIG. 6D, this rotation ensures that the polarization directions 631 and 632 of the first and second input optical beams 531 and 532, respectively, are at 45 degrees with respect to the first optical axis 208.

The first 531 and second 532 optical beams are each split into the sub-beams 241 and 242, which propagate in the first 210 and second 220 walk-off crystals in the same way as in the previously described depolarizers 200 of FIG. 2A, 300 of FIG. 3A, and 400 of FIG. 4A. The sub-beams 241 and 242 are focused by the optional right-side lens 302 into the optional output optical fiber 307.

Many variations of the depolarizer 600 are possible. As is known to a person skilled in the art, the input polarizations can be rotated by 90 degrees substantially without impacting the device performance. Furthermore, the polarization beam combiner 500 of FIG. 5A may be used instead of the in-coupling polarizer 202 in FIG. 6A. In this case, a half-wave waveplate, not shown, will have to be added into the optical path between the polarization beam combiner 500 and the first walk-off crystal 210, for rotating polarizations of the incoming optical beams 531 and 532 by 45 degrees. The construction shown in FIG. 6A is advantageous, however, because no such half-wave waveplate is required. If free space optical beam delivery is desired, the right-side lens 302 and the output optical fiber 307 may be omitted. The isolating stack 411 is also optional, although its inclusion allows the depolarizer 600 to act as an optical isolator. The relative position of the Faraday element 401 and the waveplate 402 may be varied as explained above.

Figure 7A:
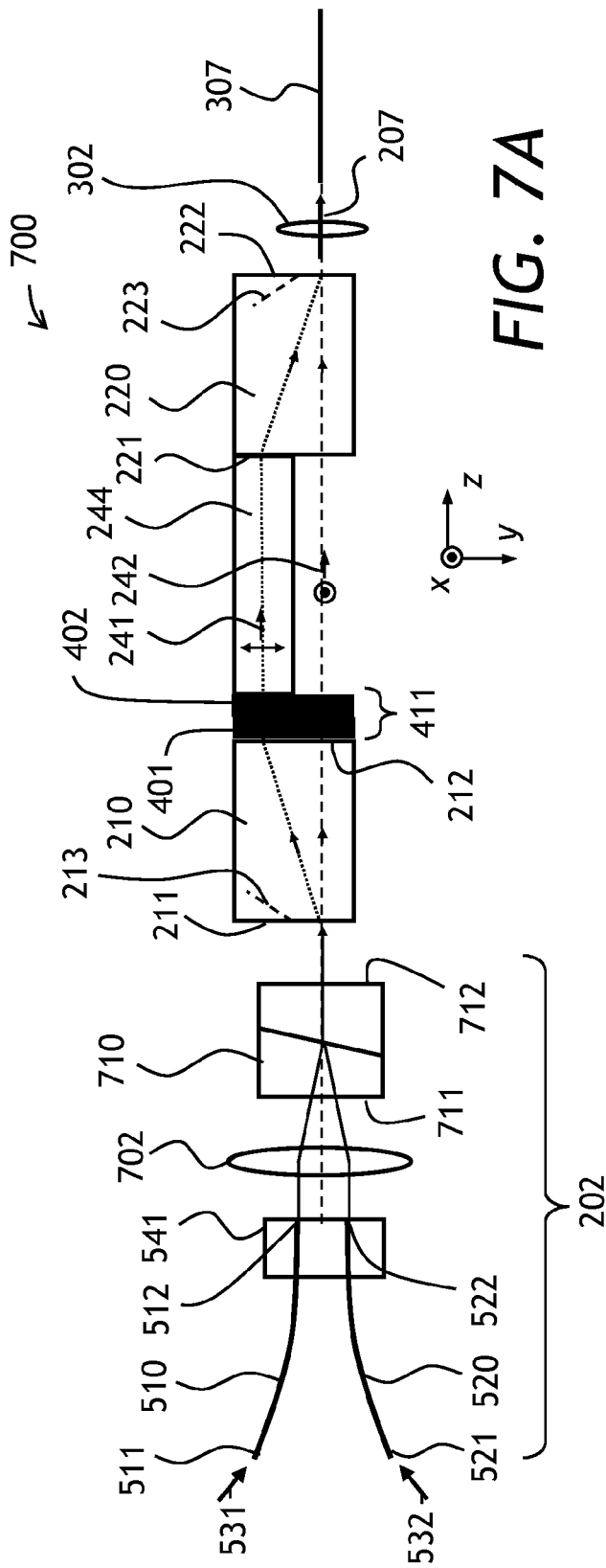
FIG. 7A is a schematic view of a beam combining isolating depolarizer of the invention, having a Wollaston prism beam combiner.
Figure 7B:
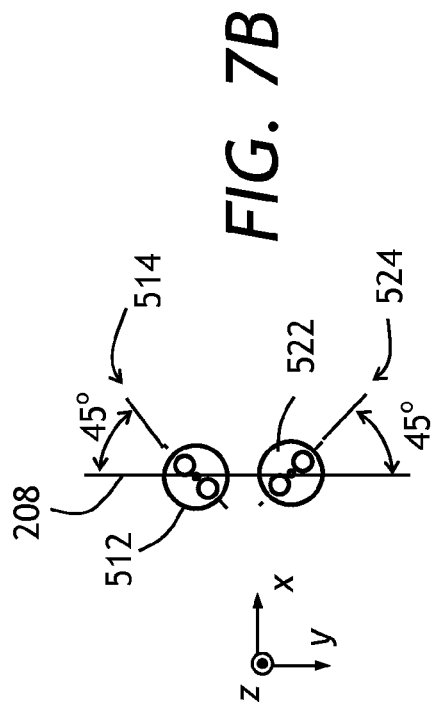
FIG. 7B is a frontal view of PM fibers of the beam combining isolating depolarizer of FIG. 7A.

Turning to FIGS. 7A and 7B with further reference to FIGS. 6A to 6D, an isolating, beam-combining depolarizer 700 of FIG. 7A is similar to the isolating, beam-combining depolarizer 600 of FIG. 6A, the difference being that the in-coupling polarizer 202 is based on a Wollaston prism 710 and not on the walk-off crystal 230. The Wollaston prism 710 has opposed first 711 and second 712 ends. In the isolating beam-combining depolarizer 700 of FIG. 7A, the in-coupling polarizer 202 further includes a lens 702 and the first 510 and second 520 PM fibers. The second ends 512 and 522 of the first and second PM fibers 510 and 520, respectively, are coupled to the first end 711 of the Wollaston prism 710 through the common lens 702.

Referring specifically to FIG. 7B, the stress directions 514 and 524 at the second ends 512 and 522 of the first and second PM fibers 210 and 520, respectively, are oriented at +45 degrees and −45 degrees, respectively, with respect to the first axis 208. The second end 712 of the Wollaston prism 710 is coupled to the first end 211 of the first walk-off crystal 210. The Wollaston prism 710 is oriented to define the linear polarizations 631 and 632 of the first and second input optical beams 531 and 532, respectively, at +45 degrees and −45 degrees, respectively, with respect to the first axis 208, as shown in FIG. 6D. The Wollaston prism 710 is sized to combine the first and second optical beams 531 and 532 at the first end 211 of the first walk-off crystal 210.

Many variations of the depolarizer 700 are possible. As is known to a person skilled in the art, the input polarizations can be rotated by 90 degrees substantially without impacting the device performance. If free space optical beam delivery is desired, the right-side lens 302 and the output optical fiber 307 may be omitted. The isolating stack 411 is also optional, although its inclusion allows the depolarizer 700 to act as an optical isolator,—a quality desirable when laser diodes are used as a light source.

Figure 8A:
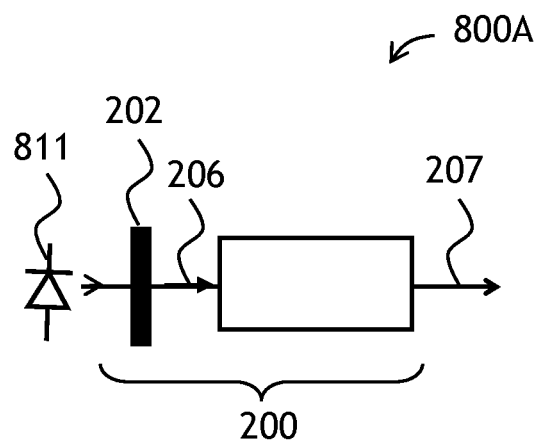
FIGS. 8A to 8C are schematic views of depolarized light sources of the invention, using: one free-space coupled laser diode (FIG. 8A); one fiber coupled laser diode (FIG. 8B); and two fiber coupled laser diodes (FIG. 8C)

The depolarizers 200, 300, 400, 600, and 700 of FIGS. 2A, 3A, 4A, 6A, and 7A, respectively, can be used to construct depolarized light sources. Turning now to FIG. 8A with further reference to FIG. 2A, a light source 800A includes the optical depolarizer 200 of FIG. 2A and a free-space emitting laser diode 811 for emitting the input optical beam 206. The laser diode 811 is coupled to the in-coupling polarizer 202 for defining polarization at 45 degrees as explained above. The coherence length of the laser diode 811 is smaller than the slab 244 length $L_2$ multiplied by the slab 244 refractive index n, whereby the output optical beam 207 is substantially depolarized. A half-wave waveplate, or another suitable polarization defining means can be used in place of the in-coupling polarizer 202; alternatively, the laser diode 811 or the depolarizer 200 can be simply rotated about the Z-axis, to define the proper incoming polarization direction.

Figure 8B:
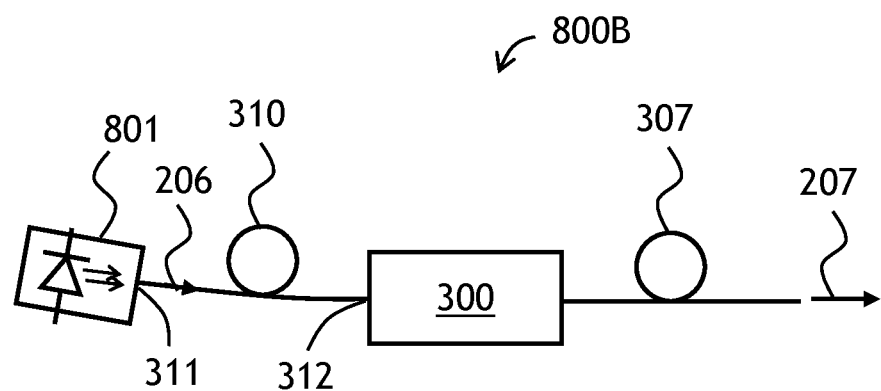

Referring to FIG. 8B with further reference to FIG. 3A, a light source 800B includes the optical depolarizer 300 of FIG. 3A and a laser diode 801 for emitting the input optical beam 206. The laser diode 801 is coupled to the first end 311 of the polarization maintaining optical fiber 310. The coherence length of the laser diode 801 is smaller than the slab 244 length $L_2$ multiplied by the slab 244 refractive index n, whereby the output optical beam 207 is substantially depolarized. The optical depolarizer 400 of FIG. 4A can be used in place of the optical depolarizer 300 of FIG. 3A.

Figure 8C:
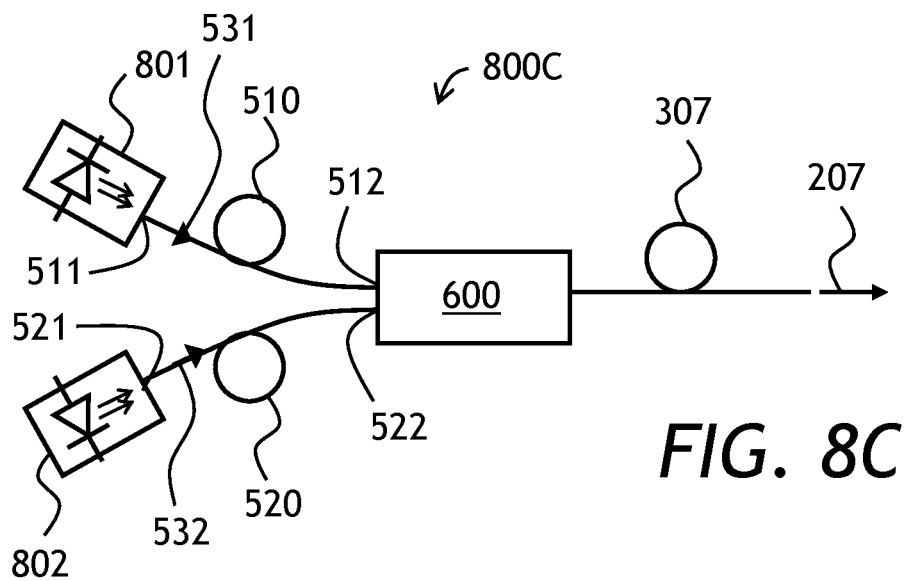

Turning to FIG. 8C with further reference to FIG. 6A, a light source 800C includes the optical depolarizer 600 of FIG. 6A, the laser diode 801 for emitting the first input optical beam 531, and a second laser diode 802 for emitting the second input optical beam 532. The laser diodes 801 and 802 are coupled to the first ends 511 and 521 of the first and second PM optical fibers 510 and 520, respectively. The coherence length of the laser diodes 801 and 802 is smaller than the slab length $L_2$ multiplied by the slab refractive index n, whereby the output combined optical beam 207 is substantially depolarized. The optical depolarizer 700 of FIG. 7A can be used in place of the optical depolarizer 600 of FIG. 6A.

The depolarized light sources 800A, 800B, and 800C can be used in a variety of applications, including Raman pumping of singlemode non-PM fibers, spectroscopy, illumination, etc.

Figure 9:
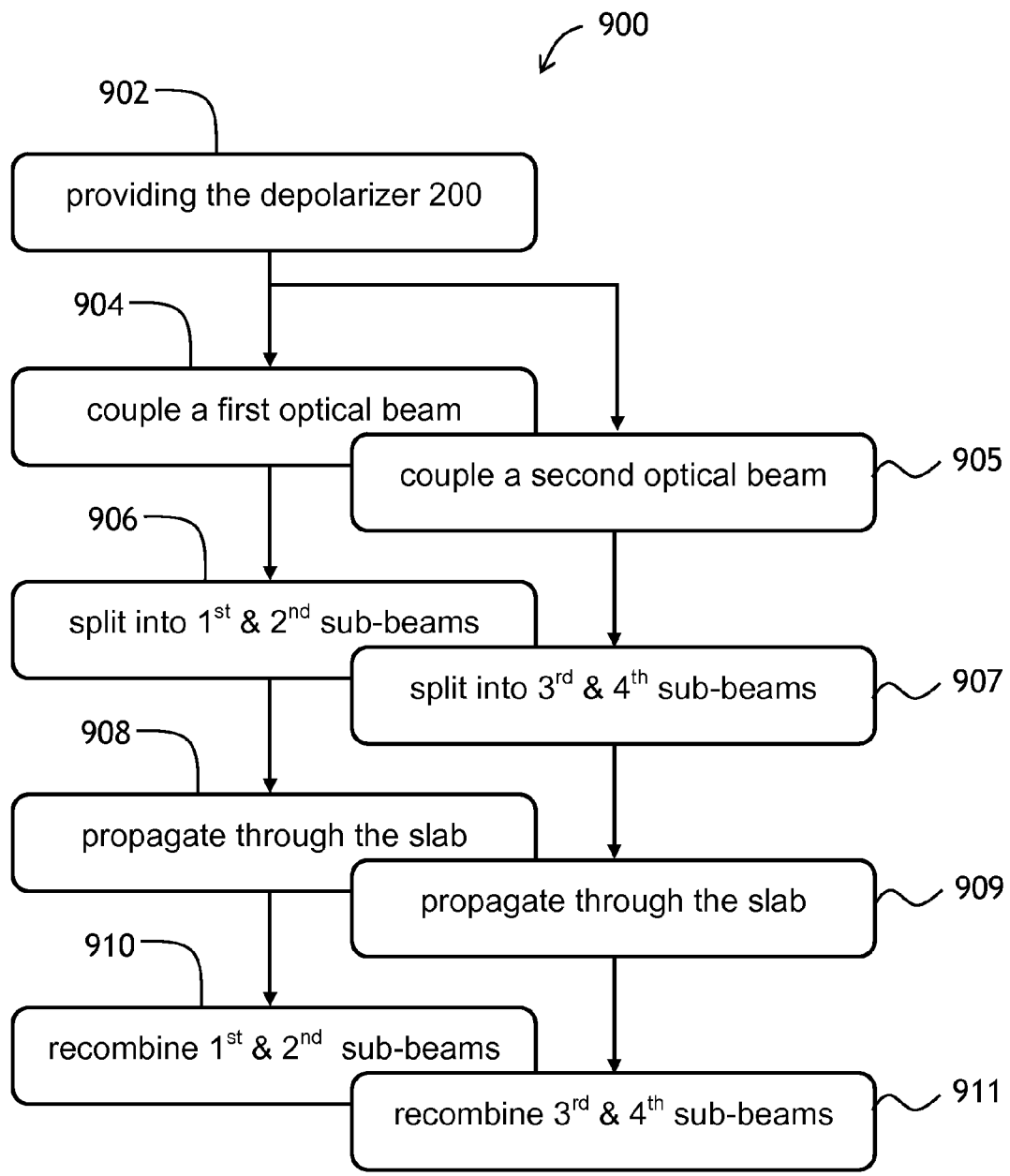
FIG. 9 is a block diagram of a method for depolarizing light according to the invention.

Referring to FIG. 9 with further reference to FIG. 2A, a method 900 for depolarizing the linearly polarized optical beam 206 includes a step 902 of providing an optical depolarizer of the invention, for example the optical depolarizer 200 of FIG. 2A. The slab 244 length $L_2$ multiplied by the slab 244 refractive index n is selected to be larger than the coherence length of the input optical beam 206. In a step 904, the optical beam 206 is coupled to the first end 211 of the first walk-off crystal 210 at 45 degrees with respect to the first axis 208.

In a step 906, the input optical beam 206 is propagated through the first walk-off crystal 210 and split thereby into the first 241 and second 242 parallel laterally offset sub-beams at the second end 212 of the first walk-off crystal 210. The first 241 and second 242 sub-beams at the second end 212 of the first walk-off crystal 210 are linearly polarized parallel and perpendicular, respectively, to the first axis 208.

In a step 908, the first sub-beam 241 is propagated in the slab 244 from the first 247 to the second 248 end thereof, and the second sub-beam 242 is propagated proximate the slab 244 in air or another low-index medium, as explained above.

Finally, in a step 910, the first 241 and second 242 sub-beams are propagated through the second walk-off crystal 220, recombining at the second end 222 of the second walk-off crystal 220 into the output optical beam 207.

Referring again to FIG. 9 with further reference to FIGS. 6A and 7A, the method 900 can be used to combine and depolarize the first and second input optical beams 531 and 532. To that end, the step 904 includes coupling the first optical beam 531 to the first walk-off crystal 210 at the polarization direction of 45 degrees with respect to the first axis 208. In a step 905, the second optical beam 532 is coupled to the first end 211 of the first walk-off crystal 210 at the polarization direction of −45 degrees with respect to the first axis 208. In other words, the polarization directions of the first and second optical beams 531 and 532 are perpendicular to each other.

In a step 907, the second optical beam 532 is propagated through the first walk-off crystal 210 and split thereby into third and fourth parallel laterally offset sub-beams, polarized in the same way as the first 241 and second 242 parallel laterally offset sub-beams, and propagating along the same paths as the first 241 and second 242 sub-beams.

In a step 909, the third sub-beam is propagated in the slab 244 from the first 247 to the second 248 end thereof, and the fourth sub-beam is propagated proximate the slab 244 in the air or another low-index medium, as explained above.

Finally, in a step 911, the third and fourth sub-beams are propagated through the second walk-off crystal 220, recombining at its second end into the output optical beam 207.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical depolarizer comprising:
   an in-coupling polarizer for defining a linear polarization of an input optical beam at 45 degrees with respect to a first axis;
   a first walk-off crystal having first and second opposed ends,
   wherein the first end of the first walk-off crystal is coupled to the in-coupling polarizer, and
   wherein the first walk-off crystal is sized and oriented to split the input optical beam launched at its first end into first and second parallel laterally offset sub-beams exiting from its second end such that the first and second sub-beams at the second end are linearly polarized parallel and perpendicular, respectively, to the first axis;
   a slab of a transparent solid material, having a refractive index and a length between first and second opposed ends thereof,
   wherein the slab length multiplied by the slab refractive index is at least 1 mm, and
   wherein the slab is coupled at its first end to the second end of the first walk-off crystal and disposed in an optical path of the first sub-beam and not in an optical path of the second sub-beam,
   whereby in operation, when the input optical beam is launched into the in-coupling polarizer, the first sub-beam propagates in the slab from the first to the second end thereof, and the second sub-beam propagates proximate the slab in air, neutral gas, or vacuum; and
   a second walk-off crystal having first and second opposed ends, coupled at the first end thereof to the slab's second end and sized and oriented to recombine the first and second sub-beams at the second end of the second walk-off crystal into an output optical beam.

2. The optical depolarizer of claim 1, wherein the in-coupling polarizer comprises a collimator lens and a polarization maintaining optical fiber having a first end for inputting the input optical beam and a second end coupled to the first end of the first walk-off crystal through the collimator lens, wherein a stress direction at the second end of the polarization maintaining fiber is at 45 degrees with respect to the first axis, thereby defining the linear polarization of the input optical beam at 45 degrees with respect to the first axis.

3. The optical depolarizer of claim 2, further comprising a Faraday element and a waveplate, coupled between the second end of the first walk-off crystal and the first end of the second walk-off crystal.

4. The optical depolarizer of claim 3, wherein the Faraday element and the waveplate are mechanically coupled to each other and oriented for rotating polarization of light propagating from the second walk-off crystal to the first walk-off crystal by 90 degrees, while substantially not rotating the polarization of light propagating from the first walk-off crystal to the second.

5. The optical depolarizer of claim 1, wherein the in-coupling polarizer comprises:
a third walk-off crystal having opposed first and second ends;
first and second adjacently disposed collimator microlenses; and
first and second polarization maintaining fibers each having a first end for inputting first and second input optical beams, respectively, and a second end coupled to the first end of the third walk-off crystal through the first and second collimator microlenses, respectively;
wherein the second end of the third walk-off crystal is coupled to the first end of the first walk-off crystal; and
wherein the third walk-off crystal is sized to combine the first and second optical beams at the first end of the first walk-off crystal.

6. The optical depolarizer of claim 5, wherein stress directions at the second ends of the first and second polarization maintaining fibers are oriented at +45 degrees and −45 degrees, respectively, with respect to the first axis, wherein the third walk-off crystal is oriented to define linear polarizations of the first and second input optical beams at +45 degrees and −45 degrees with respect to the first axis.

7. The optical depolarizer of claim 6, wherein the in-coupling polarizer further comprises a first substrate having a pair of parallel through openings for supporting therein the second ends of the first and second polarization maintaining fibers;
wherein the first and second collimator microlenses are disposed on or within a common second substrate, wherein the first and second substrates are mechanically affixed to each other.

8. The optical depolarizer of claim 5, further comprising a Faraday element and a waveplate coupled between the second end of the first walk-off crystal and the first end of the second walk-off crystal.

9. The optical depolarizer of claim 8, wherein the Faraday element and the waveplate are mechanically coupled to each other and oriented for rotating by 90 degrees polarization of light propagating from the second walk-off crystal to the first, while substantially not rotating the polarization of light propagating from the first walk-off crystal to the second.

10. The optical depolarizer of claim 1, wherein the in-coupling polarizer comprises:
a Wollaston prism having opposed first and second ends;
a lens;
first and second polarization maintaining fibers each having a first end for inputting first and second input optical beams, respectively, and a second end coupled to the first end of the Wollaston prism through the lens,
wherein the second end of the Wollaston prism is coupled to the first end of the first walk-off crystal; and
wherein the Wollaston prism is sized and oriented to combine the first and second optical beams at the first end of the first walk-off crystal.

11. The optical depolarizer of claim 10, wherein stress directions at the second ends of the first and second polarization maintaining fibers are oriented at +45 degrees and −45 degrees, respectively, with respect to the first axis; and wherein the Wollaston prism is oriented to define the linear polarization of the first and second input optical beams at +45 degrees and −45 degrees, respectively, with respect to the first axis.

12. The optical depolarizer of claim 10, further comprising a Faraday element and a waveplate coupled between the second end of the first walk-off crystal and the first end of the second walk-off crystal, wherein the Faraday element and the waveplate are mechanically coupled to each other and oriented for rotating by 90 degrees polarization of light propagating from the second walk-off crystal to the first, while substantially not rotating the polarization of light propagating from the first walk-off crystal to the second.

13. The optical depolarizer of claim 1, wherein the slab length multiplied by the slab refractive index is at least 3 mm.

14. The optical depolarizer of claim 1, wherein the slab comprises glass or crystalline silicon.

15. The optical depolarizer of claim 1, wherein the first and second walk-off crystals comprise $YVO_4$ or rutile.

16. A light source comprising the optical depolarizer of claim 1 and a laser diode for emitting the input optical beam having a coherence length;
wherein the laser diode is coupled to the in-coupling polarizer;
wherein the coherence length is smaller than the slab length multiplied by the slab refractive index, whereby in operation, the output optical beam is substantially depolarized.

17. The light source of claim 16, wherein the in-coupling polarizer comprises a collimator lens and a polarization maintaining optical fiber having a first end for inputting the input optical beam and a second end coupled to the first end of the first walk-off crystal through the collimator lens,
wherein a stress direction at the second end of the polarization maintaining fiber is at 45 degrees with respect to the first axis, thereby defining the linear polarization of the input optical beam at 45 degrees with respect to the first axis.

18. A light source comprising the optical depolarizer of claim 5 and first and second laser diodes for emitting the first and second input optical beams, respectively, having first and second coherence lengths, respectively;
wherein the first and second laser diodes are coupled to the first ends of the first and second polarization maintaining optical fibers, respectively,
wherein the first and second coherence lengths are smaller than the slab length multiplied by the slab refractive index, whereby the output optical beam is substantially depolarized.

19. A method for depolarizing a linearly polarized optical beam, the method comprising:
(a) providing the optical depolarizer of claim 1;
(b) coupling a first input optical beam having a first coherence length to the first end of the first walk-off crystal, wherein the first input optical beam is linearly polarized at 45 degrees with respect to the first axis, and wherein the slab length multiplied by the slab refractive index is selected to be larger than the first coherence length;

(c) allowing the first input optical beam to propagate through the first walk-off crystal and split into first and second parallel laterally offset sub-beams at the second end of the first walk-off crystal, wherein the first and second sub-beams at the second end of the first walk-off crystal are linearly polarized parallel and perpendicular, respectively, to the first axis;

(d) allowing the first sub-beam to propagate in the slab from the first to the second end thereof, and the second sub-beam to propagate proximate the slab in the air, the neutral gas, or the vacuum; and (e) allowing the first and second sub-beams to propagate through the second walk-off crystal to recombine at the second end of the second walk-off crystal into the output optical beam.

20. The method of claim 19, further comprising:

(b1) coupling a second input optical beam having a second coherence length to the first end of the first walk-off crystal, wherein the second input optical beam is linearly polarized at −45 degrees with respect to the first axis, and wherein the slab length multiplied by the slab refractive index is selected to be larger than the second coherence length;

(c1) allowing the second input optical beam to propagate through the first walk-off crystal and split into third and fourth parallel laterally offset sub-beams at the second end of the first walk-off crystal, wherein the third and fourth sub-beams at the second end of the first walk-off crystal are linearly polarized parallel and perpendicular, respectively, to the first axis;

(d1) allowing the third sub-beam to propagate in the slab from the first to the second end thereof, and the fourth sub-beam to propagate proximate the slab in the air, the neutral gas, or the vacuum; and (e1) allowing the third and fourth sub-beams to propagate through the second walk-off crystal to recombine at the second end of the second walk-off crystal into the output optical beam.

\* \* \* \* \*